United States Patent
Collings et al.

(10) Patent No.: US 12,443,038 B2
(45) Date of Patent: Oct. 14, 2025

(54) PUPIL EXPANDER

(71) Applicant: Envisics Ltd, Milton Keynes (GB)

(72) Inventors: Neil Collings, Milton Keynes (GB); Alexander Cole, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 624 days.

(21) Appl. No.: 17/780,057

(22) PCT Filed: Dec. 2, 2020

(86) PCT No.: PCT/EP2020/084267
§ 371 (c)(1),
(2) Date: May 26, 2022

(87) PCT Pub. No.: WO2021/110746
PCT Pub. Date: Jun. 10, 2021

(65) Prior Publication Data
US 2023/0333374 A1    Oct. 19, 2023

(30) Foreign Application Priority Data
Dec. 2, 2019 (GB) ..................................... 1917584

(51) Int. Cl.
*G02B 27/01* (2006.01)
(52) U.S. Cl.
CPC ......... *G02B 27/0103* (2013.01); *G02B 27/01* (2013.01); *G02B 2027/0123* (2013.01)
(58) Field of Classification Search
None
See application file for complete search history.

(56) References Cited

U.S. PATENT DOCUMENTS 4,188,090 A    2/1980 Ellis
10,191,188 B2 *  1/2019 Powell .................. G02B 27/30
(Continued)

FOREIGN PATENT DOCUMENTS

| CN | 109656025 | 4/2019 |
| GB | 1538545 | 1/1979 |
| WO | 2014/009717 | 1/2014 |

OTHER PUBLICATIONS

International Search Report and Written Opinion, PCT/EP2020/084267, Feb. 3, 2021 (19 pages).
(Continued)

*Primary Examiner* — Dung T Nguyen
(74) *Attorney, Agent, or Firm* — Akerman LLP

(57) ABSTRACT

Disclosed embodiments include a display system having a viewing window on a viewing plane, the display system comprising a picture-generating unit and an imaging system, where the picture-generating unit displays a picture on a display plane that is a holographic reconstruction formed from a hologram of the picture. The imaging system comprises a projection lens disposed between the display plane and viewing plane, an aperture stop, and a waveguide pupil expander. The projection lens comprises a pair of planar surfaces that define the boundaries of the projection lens, the aperture stop restricts the aperture of the projection lens in the first direction and forms the limiting aperture stop of the imaging system, and the waveguide pupil expander receives light of the picture from the projection lens through the aperture stop and replicates the aperture stop to expand the viewing window of the display system.

18 Claims, 16 Drawing Sheets

(56) References Cited

U.S. PATENT DOCUMENTS

| | | |
|---|---|---|
| 2009/0147331 A1 | 6/2009 | Ashkenazi |
| 2011/0157667 A1* | 6/2011 | Lacoste ................ G03H 1/2249 359/9 |
| 2012/0224062 A1 | 9/2012 | Lacoste |
| 2013/0250431 A1 | 9/2013 | Robbins |
| 2018/0338131 A1 | 11/2018 | Robbins |

OTHER PUBLICATIONS

Search and Examination Report, GB1917584.3, Aug. 7, 2020 (12 pages).

Examination Report issued in application EP 20 812 385.1 dated Jul. 21, 2023 (10 pages).

"Wikipedia: Simple lens," Apr. 2, 2017, Retrieved from the Internet: URL: https://en.wikipedia.org/w/index.php?title=Simple_lens&oldid=773459723 [retrieved on Jul. 12, 2023] (2 pages).

* cited by examiner

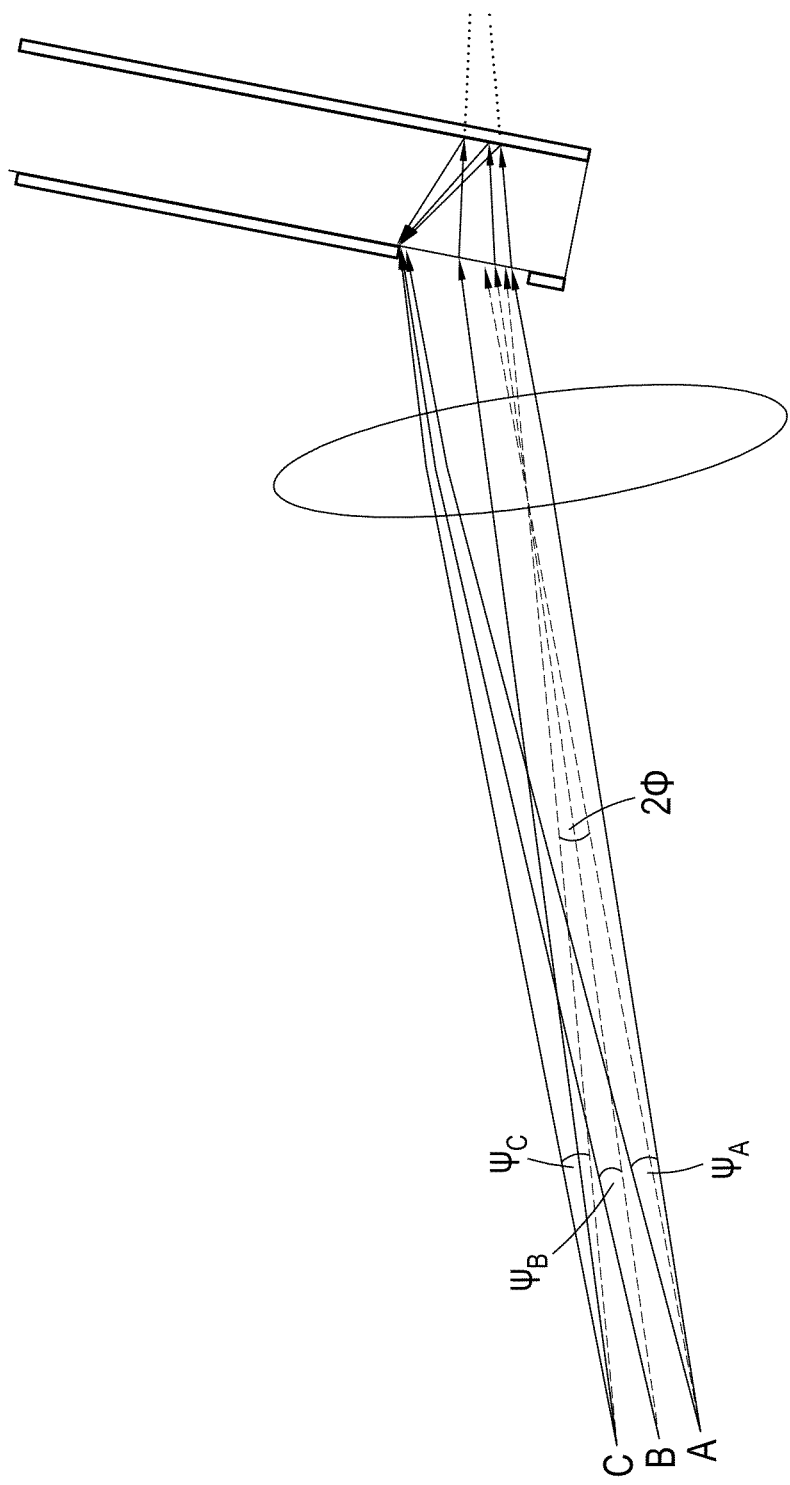

PUPIL EXPANDER

CROSS-REFERENCE TO RELATED APPLICATIONS

This application is a U.S. National Stage application of International Patent Application No. PCT/EP2020/084267, filed Dec. 2, 2020, which claims the benefit of priority of United Kingdom Patent Application No. GB 1917584.3, filed Dec. 2, 2019. The entire contents of PCT/EP2020/084267 and GB 1917584.3 are incorporated herein by reference.

FIELD

The present disclosure relates to a pupil expander such as a waveguide pupil expander. More specifically, the present disclosure relates to a projection lens for a waveguide pupil expander. The present disclosure also relates to a projector and a method of projection such as a holographic projection and a method of holographic projection. Some embodiments relate to a head-up display. Some embodiments relate to optimising image quality within a viewing window.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic display device, such as a holographic projector, may be provided using the system described herein. Such projectors have found application in head-up displays, "HUD".

SUMMARY

Aspects of the present disclosure are defined in the appended independent claims.

There is disclosed herein a display system having a viewing window on a viewing plane. The display system comprises a picture generating unit and an imaging system. The picture generating unit is arranged to display a picture on a display plane. The picture is a holographic reconstruction formed from a hologram of the picture. The imaging system is arranged to form an image of the picture on an image plane that is viewable from the viewing window. The imaging system comprises a projection lens, an aperture stop and a first waveguide pupil expander. The projection lens is disposed between the display plane and viewing plane. The projection lens is a simple lens arranged to magnify the picture. That is, the projection lens is not a complex optical component such as a customised optic. In embodiments, the projection lens receives light of the picture from the display plane and forms a magnified image of the picture on the image plane. In some embodiments, the distance between the lens and the display plane is less than the focal length of the lens so that an image is formed on an image plane at a defined distance from the lens. It may be said that the projection lens is a magnifier (i.e. arranged to operate as a magnifier). The projection lens may comprise pair of planar surfaces, wherein the first direction is normal to each planar surface. The pair of planar surfaces define the boundaries (i.e. edges or sides) of the projection lens in the first direction. It may be said that, in embodiments, the projection lens is cropped in the first direction, such that the aperture stop is integral with the projection lens. The aperture stop is arranged to reduce/define/limit the aperture of the projection lens in a first direction and form the limiting aperture stop of the imaging system. Alternatively, or additionally, it may be said that the aperture stop is arranged to exclude (e.g. by masking or removal) a peripheral section of the projection lens in the first direction. That is, the aperture stop is arranged to block or prevent light rays related to the peripheral section of the projection lens. The first waveguide pupil expander is arranged to receive light of the picture from the projection lens through the aperture stop and replicate the aperture stop in order to expand the exit pupil in a first direction.

Notably, the imaging system may include a limiting aperture stop defined on the plane of the projection lens, wherein the limiting aperture stop defines an aperture including a centre section of the projection lens and excluding a peripheral section of the projection lens. Optionally, the peripheral section of the projection lens may be removed (e.g. by cropping). It may be said that the imaging system comprises a limiting aperture on the plane of the projection lens, wherein the limiting aperture corresponds to only the centre section of the projection lens.

There is disclosed herein an imaging system comprising a simple projection lens arranged to magnify a picture formed by a picture generating unit and to form or project an image of the picture on an image plane. A disadvantage of using a simple projection lens to magnify an object— particularly, when a large viewing window is required—is that aberrations can reduce the quality of the image of the picture. The periphery of the lens, where the curvature is greatest, contributes most to image aberration. The inventor has realised that a waveguide pupil expander can be designed to replicate only the centre section of the projection lens in order to improve image quality. An aperture stop is used to eliminate light rays from the periphery of the projection lens. The aperture stop restricts the angle of the pencil of light rays entering the waveguide pupil expander. In some embodiments, the projection lens is cropped in one dimension from both sides in the direction of pupil expansion in order to form the aperture stop. In some embodiments, the aperture stop (in cross-section) is a rectangular window having a shortest dimension in the direction of pupil expansion, wherein the rectangular window is centred on the lens. The aperture stop forms the limiting aperture stop of the optical system but the inventor has found that a waveguide pupil expander can be designed with sufficient replicas of the aperture stop such that the advantages of reducing the aperture of the projection lens outweigh the disadvantages.

In embodiments, the picture generating unit comprises a holographic display device. Thus, the display system is a coherent light system. The inventor has realised that the advantages of providing an aperture stop displaced from the plane of the projection lens to reduce aberrations in a conventional (e.g. white light) system are outweighed by the adverse effects of edge diffraction in a coherent light system. Thus, in embodiments, the limiting aperture stop is defined on the plane of the projection lens, such as by cropping the projection lens or applying a mask to the projection lens.

The waveguide pupil expander generates extra light rays of the picture in order to expand the pupil. It may be said that the waveguide pupil expander replicates light of the picture passing through the aperture stop or, simply, replicates the aperture stop. The exit pupil of the imaging system is expanded because the exit pupil is the image of the aperture stop.

The diameter of the aperture stop is less than the diameter of the projection lens. In other words, the aperture stop reduces the aperture of the projection lens.

The term "simple lens" is used herein to indicate that the lens is an off-the-shelf component or stock component. The term "simple lens" indicates that the lens has not be optimised or customised for use in the imaging system of the present disclosure.

The waveguide pupil expander comprises two reflective surfaces. One reflective surface—e.g. the first reflective surface—is partially transmissive and partially reflective. The partial transmissivity leads to the formation of replicas of the light rays received by the waveguide. The other reflective surface—e.g. the second reflective surface—of the waveguide is a perfect or near-perfect reflector—e.g. a perfect mirror. Spatially-modulated light is received at an input port of the waveguide. The waveguide may be substantially slab-shaped, wherein the separation of the two reflective surfaces is less than the dimensions of the two reflective surfaces. Each reflective surface is substantially planar. The waveguide is configured such that the viewer should look at the large surface of one of the reflective surfaces—e.g. the partially reflective surface. This surface may be referred to as the viewing surface. The input port may be on the same side of the slab as the viewer or it may be on the opposite side. The input port may comprise a break or gap in the reflective component—e.g. reflective layer or coating—of the fully reflective surface or the partially reflective surface. The input port may alternatively begin at the end of the reflective component.

The viewing window may be an eye-box or an eye-motion-box. The waveguide enlarges the viewing experience due to the generation of extra rays by division of amplitude of the incident wavefront.

The first surface of the waveguide comprises a partially transmissive-reflective coating. The reflectivity of the coating is not constant along the length of the waveguide (in the general light propagation direction). However, for an optimal viewing experience, the brightness of each colour image should not change as the viewer moves around within the viewing window.

The waveguide replicates the rays of the incident wavefront in order to expand the pupil. Each successive replica is formed by one more bounce of the light rays within the waveguide. The reflectivity/transmissivity of the viewing surface is therefore graded—that is, changes with distance along the waveguide—in order to compensate for the decrease in light intensity along the waveguide owing to partial escape of the light at each bounce. The reflectivity of the graded coating therefore decreases with distance from the input port. The graded coating may comprise a stack of thin films, optionally, wherein each thin film is a dielectric or a metal. The person skilled in the art will be familiar with the design of such stacks.

In some embodiments, the aperture stop is a mask. The diameter of the aperture stop is less than the diameter of the (fully formed) projection lens. The diameter of the aperture stop is less than 80% the diameter of the projection lens such as less than 60% or less than 30% the diameter of the projection lens. In some embodiments, the size and shape of the projection lens is physically cropped such that the perimeter of the projection lens is the limiting aperture of the imaging system. A dimension of the centre section of the projection lens is less than 80%, such as less than 60% or less than 30%, of the dimension of the fully formed projection lens.

The extent of the limiting aperture stop (i.e. amount or proportion of reduction in diameter of the aperture) is selected based on a number of factors, including the curvature of the lens, the size of the entrance pupil of the pupil expander and the distance between the lens and the pupil expander. The limiting aperture stop removes light rays projected from the peripheral parts of the lens where the curvature is large, which contribute most to aberrations. However, when the size of the aperture stop reduces the diameter of the projection lens to a large extent (e.g. to less than 80%), the magnified image projected by the lens is disadvantageously "vignetted" (i.e. cropped). The inventor has found that this disadvantage can be compensated by extending the image using the pupil expander instead of the lens. The inventor has further unexpectedly found that, in some embodiments, internal reflections of high angled rays from the cut faces of the lens due to cropping are acceptable, whilst, in other embodiments, such reflections can be minimised by using a black coating on the cut faces.

The projection lens may be based on a spherical lens, a biconvex lens or an achromatic doublet. The projection lens is arranged to receive light of the picture displayed on the display plane and to form a magnified image on an image plane. It may be said that the image plane is at a projection distance of the projection lens. That is, the projection lens is arranged so that the image is not formed at infinity. In embodiments in which the projection lens is cropped in accordance with the aperture stop, a cross-section of the projection lens on the optical axis comprises a pair of parallel, straight sides.

The display plane may comprise a screen, such as a diffuser, arranged to display the picture. Alternatively, the picture may be formed in free-space between the picture generating unit and waveguide pupil expander. It may be said that the waveguide pupil expander receives light of the picture to indicate that the picture has been formed at the display plane. In other examples, the waveguide pupil expander receives light encoded with the hologram of the picture. In these other examples, the viewer's eye performs a hologram-to-image transformation such as a Fourier transformation.

The projection lens of the imaging system couples light of the picture received from the display plane into the first waveguide pupil expander. In embodiments, the light of the picture is diffuse or scattered. The projection lens couples uncollimated (or non-collimated) light of the picture into the first waveguide pupil expander. It may be said that the input light beam received by the first waveguide pupil expander from the projection lens is an uncollimated light beam.

The picture generating unit may comprise a spatial light modulator arranged to display the hologram of the picture and a light source arranged to illuminate the hologram during display in order to form the holographic reconstruction on the display plane.

The display system may be a colour display system. The picture may therefore be a colour picture comprising at least two single colour components. That is, the picture may comprise a first colour component and a second colour component. The picture may comprise a red, green and blue component each formed by holographic reconstruction. The picture generating unit may comprises three single colour holographic channels. Each holographic channel may comprise an array of light modulating pixels, a light source and a hologram source. The plurality of single colour pictures may be coincident on the display plane to form a full colour display.

The display system may further comprise a second waveguide pupil expander arranged to receive the output of the first waveguide pupil expander and replicate the aperture stop in a second direction in order to further expand the pupil. The second waveguide pupil expander may be perpendicular to the first waveguide pupil expander such that the first direction is orthogonal to the second direction. Accordingly, two-dimensional expansion of the pupil is provided. In some embodiments, the projection lens has two pairs of planar surfaces, wherein the first direction of pupil expansion is normal to both surfaces of the first pair and the second direction of pupil expansion is normal to both surfaces of the second pair.

The aperture stop may be arranged to reduce the aperture of the projection lens in the second direction.

Each waveguide pupil expander may comprise a pair of parallel reflective surfaces arranged to guide the light of the picture from an input port to the viewing window by a series of internal reflections therefrom, wherein the reflectivity of one reflective surface of the pair of parallel reflective surfaces is provided by a graded coating that is partially transmissive.

A viewer may directly view the expanded exit pupil of the waveguide pupil expander. In embodiments comprising a projection optic arranged as a magnifier, the viewer sees a magnified virtual image of the picture on the image plane at a defined distance behind the waveguide pupil expander.

The display system may be used for head-up display. In other words, a head-up display comprising the display system may be formed. The head-up display comprises an optical combiner, which receives light of the picture from the exit pupil of the waveguide pupil expander. The optical combiner forms a virtual image of the picture on the image plane at a distance from the viewer. It may be said that the optical combiner moves the virtual image/image plane to a position behind the optical combiner. In particular, the optical combiner forms the virtual image/image plane at the same distance behind the optical combiner as the distance at which the virtual image/image plane would have been formed behind the pupil expander in the absence of an optical combiner as described above.

There is also disclosed herein a method of display using a display system having a viewing window on a viewing plane. The method comprises a first step of holographically reconstructing a picture on a display plane from a hologram of the picture using a picture generating unit. The method comprises a second step of forming an image of the picture on an image plane that is viewable from the viewing window using an imaging system. The second step comprises magnifying the picture using a projection lens disposed between the display plane and viewing plane. The projection lens is a simple lens. The second step further comprises restricting the limiting aperture stop of the imaging system by reducing the aperture of the projection lens in a first direction. The second step yet further comprises replicating the aperture stop in order to expand the viewing window of the display system in a first direction using a waveguide pupil expander arranged to receive light of the picture from the projection lens.

The method may further comprise displaying a hologram of the picture on a spatial light modulator and illuminating the hologram during display using a light source in order to form the holographic reconstruction on the display plane.

The method may further comprise receiving the output of the first waveguide pupil expander using a second waveguide pupil expander and replicating the aperture stop in a second direction in order to further expand the pupil. The second waveguide pupil expander is perpendicular to the first waveguide pupil expander such that the first direction is orthogonal to the second direction.

The method may further comprise reducing the aperture of the projection lens in the second direction.

The term "projection lens" is used herein to refer to a lens that is arranged to form an image on an image plane. The projection lens of the present disclosure is a lens arranged (e.g. positioned) to output uncollimated light (e.g. diverging or converging light) for forming an image. Thus, the projection lens of the present disclosure is not a collimating lens. The projection lens of the present disclosure is arranged (e.g. positioned) to project not collimate. In embodiments, the projection lens is a magnifier. That is, the projection lens is arranged such that the object (e.g. picture generating unit) is at a distance less that the focal length of the lens so as to form a magnified image on an image plane. In this case, the magnified image formed in the image plane is a virtual image. Accordingly, the term "projection lens" does not include a lens arranged as a "collimating lens" (e.g. a lens arranged so that the distance between the lens and the diffuser is equal to the focal length so as to output collimated light) so as to form an image at infinity rather than on an image plane.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "writing" and "addressing" may be used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIGS. 8B and 8C are ray diagrams showing axial rays, and limit rays for inclinations of $+\phi$ and $-\phi$, from the projection optic and into the entrance pupil of a pupil expander comprising an air gap and glass input port, respectively, in accordance with embodiments.

The drawings are for the purposes of illustration only and are not to scale. The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
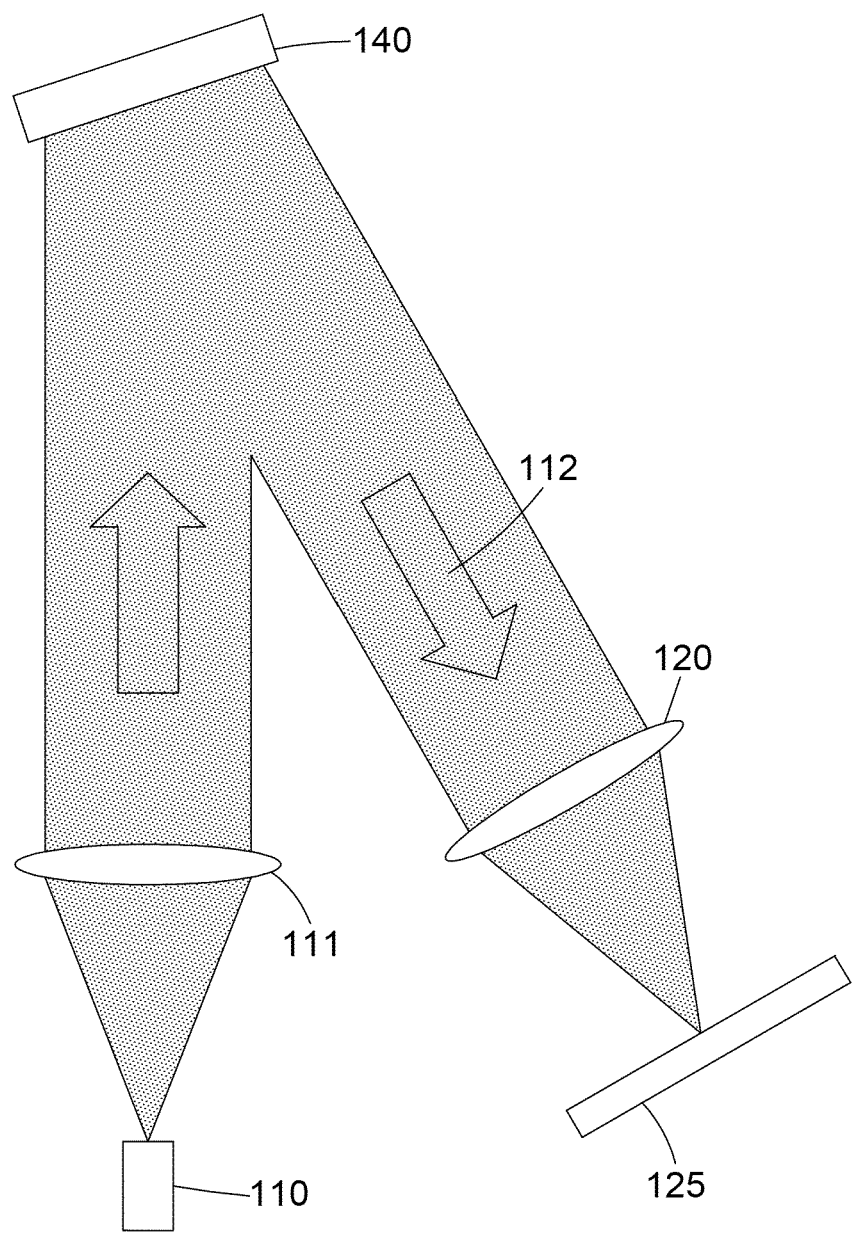
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi$ [u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi$[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
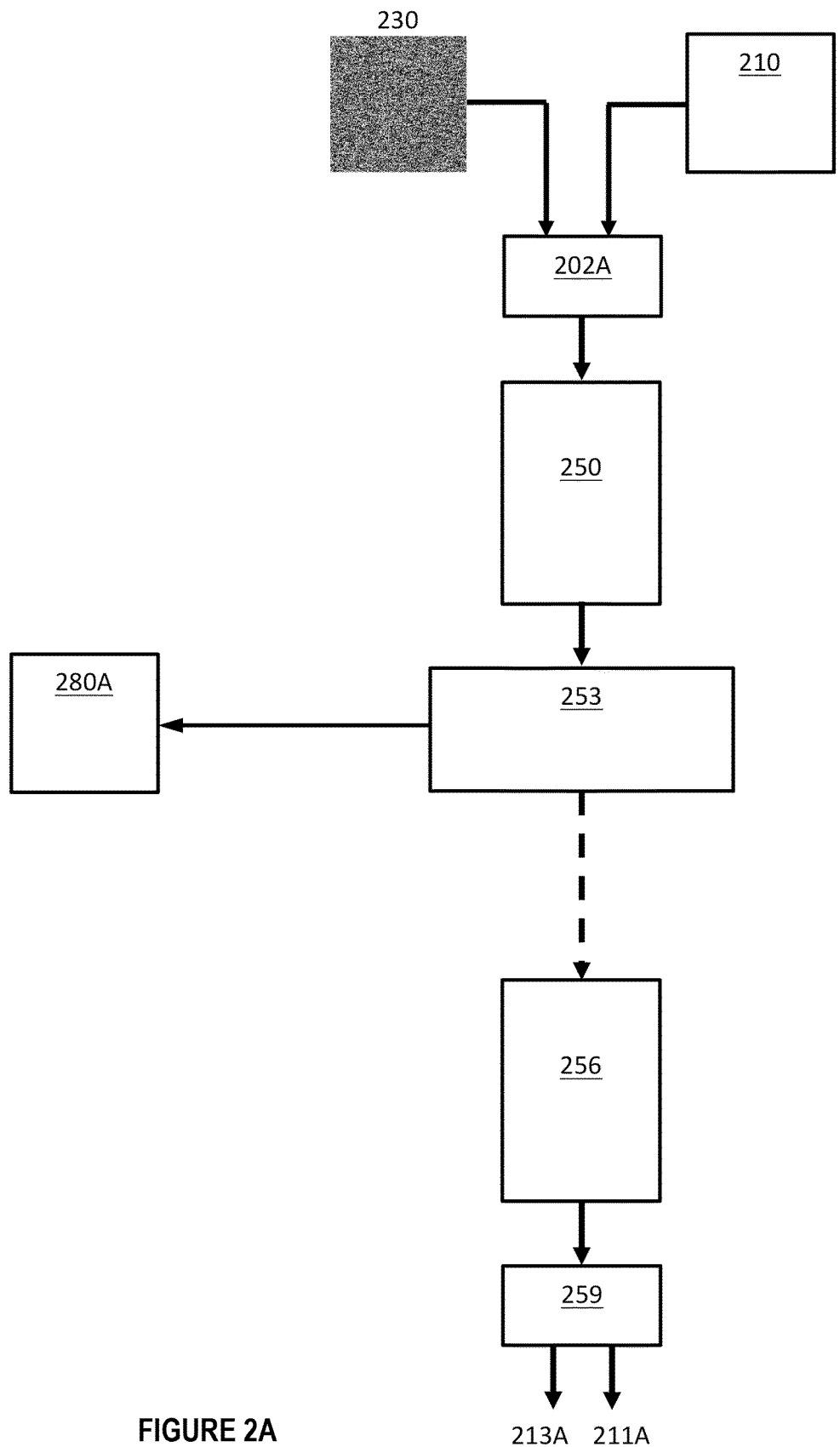
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
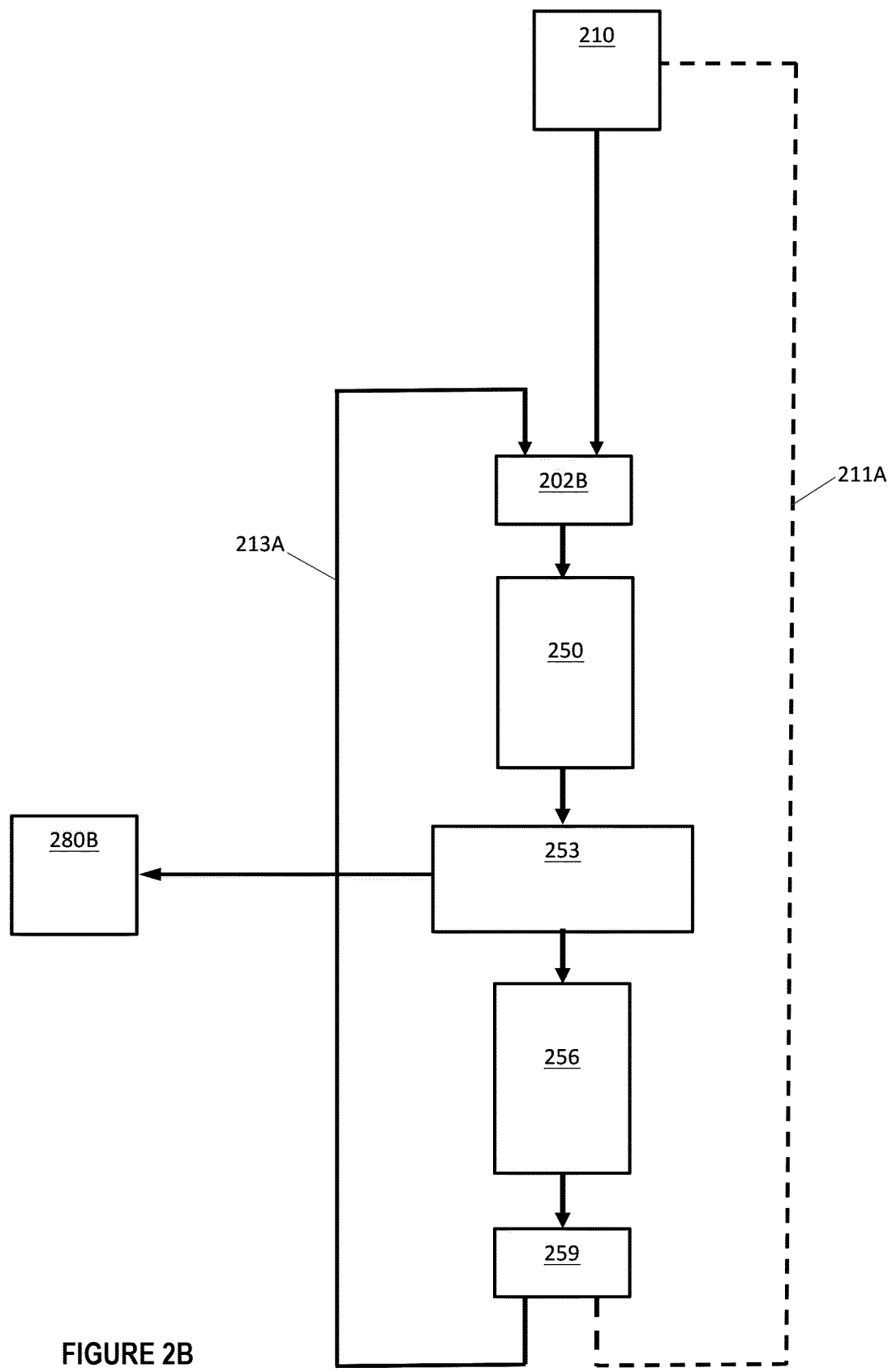
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
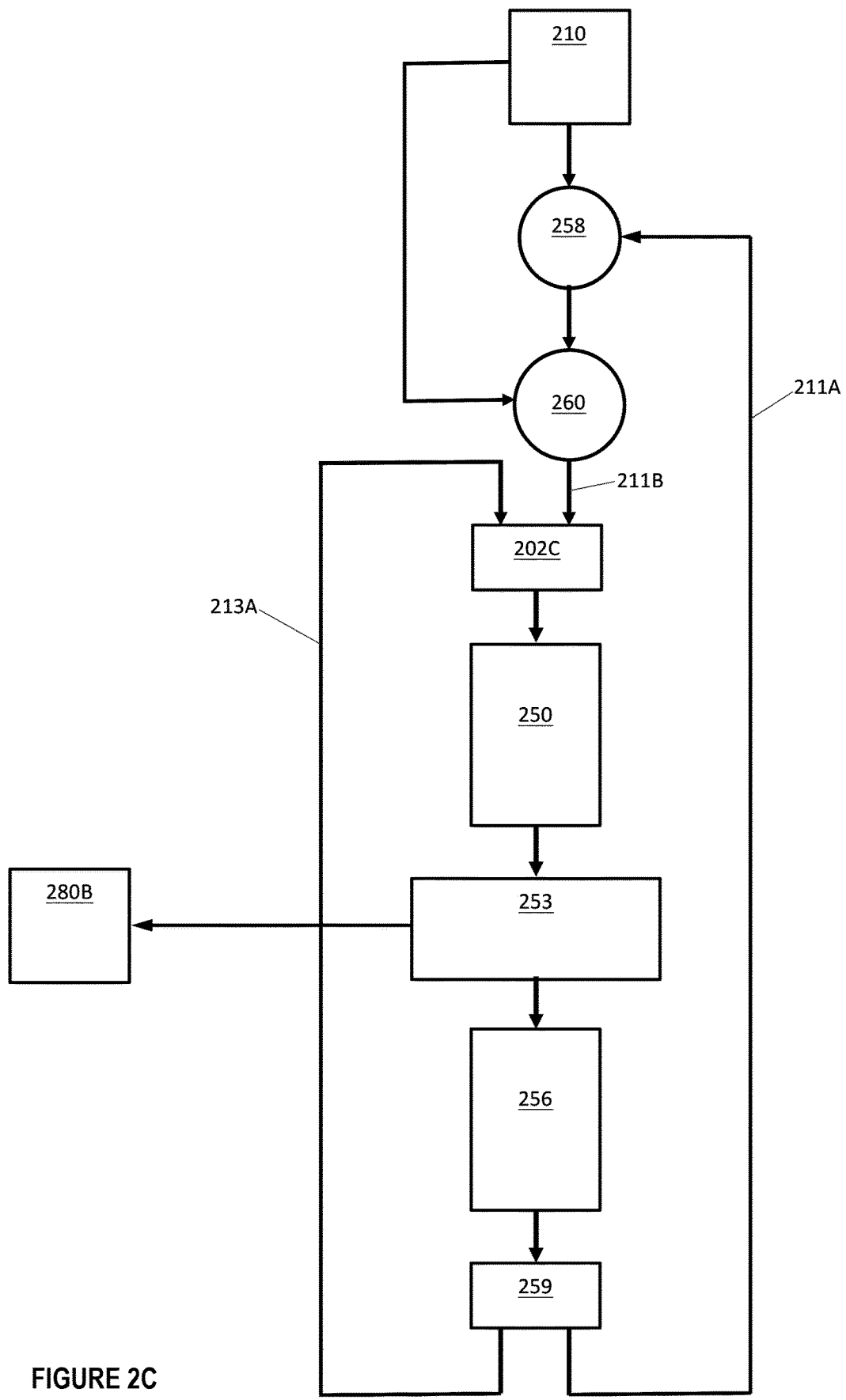
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
Ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram Ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
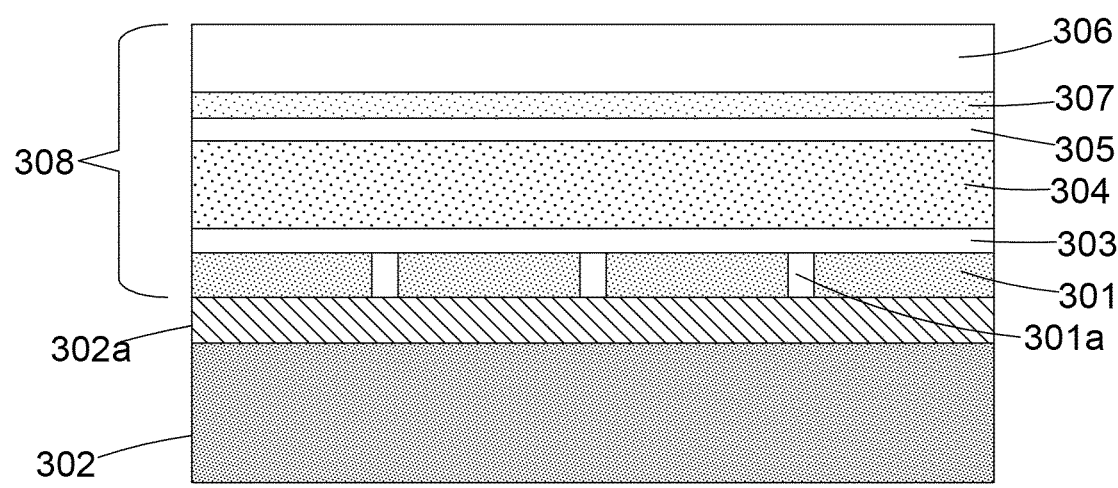
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Waveguide

In holographic projection systems such as head-up displays (HUDs) it is desirable to expand the exit pupil. In particular, the viewer needs to be able to move his or her head around and so able to see the complete image from any position within a limited area at the eye box/viewing distance. This is known as the eye motion box (EMB) or viewing window. Thus, a pupil expander may be employed to enlarge the exit pupil. Typically, the pupil expander generates extra rays by division of the amplitude of the incident wavefront.

Figure 4:
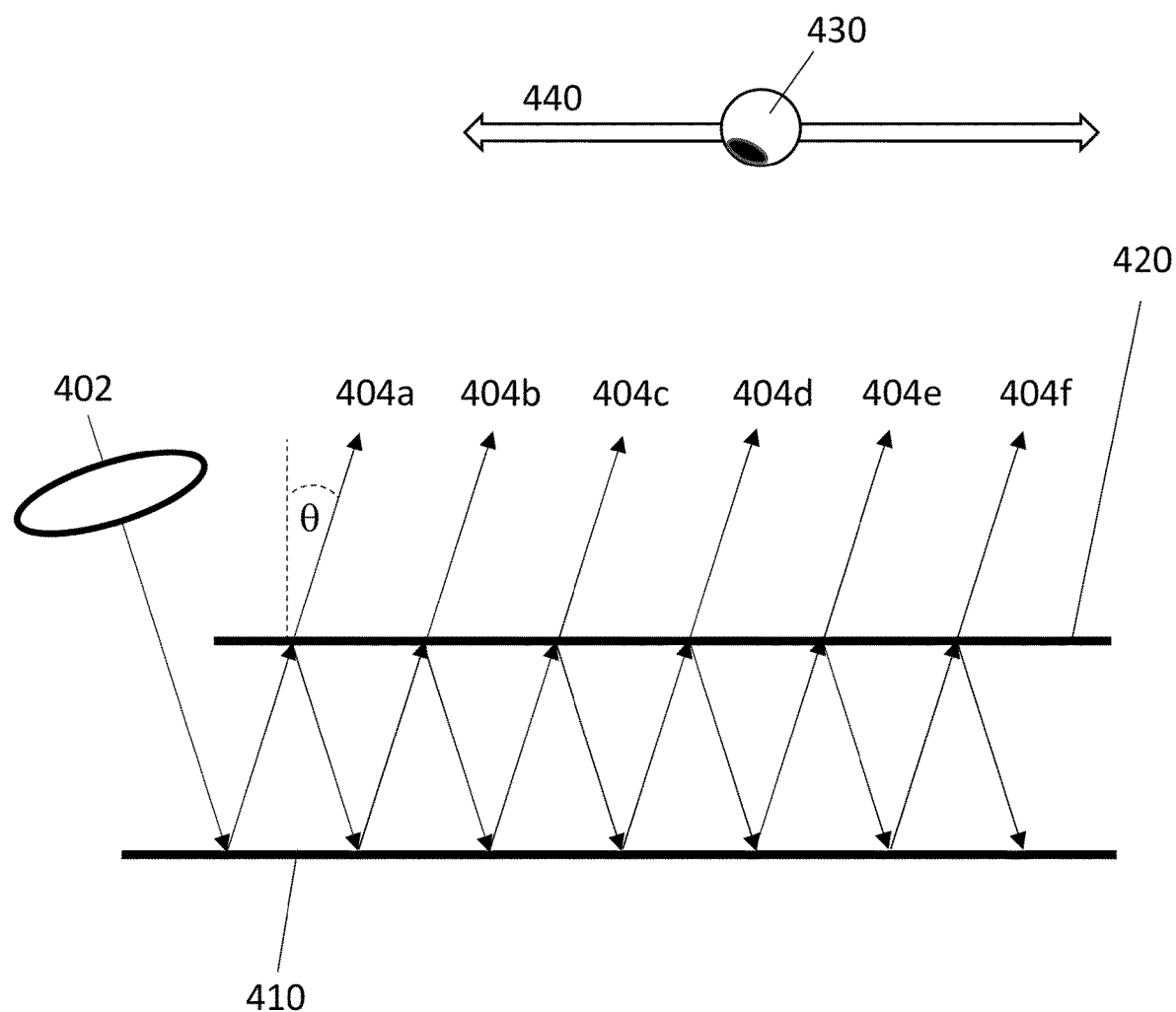
FIG. 4 shows an example pupil expander comprising a waveguide.

FIG. 4 illustrates an example pupil expander comprising a waveguide. The general principle of a waveguide is known in the art and not described in detail herein. A waveguide guides light within a layer between a pair of parallel reflective surfaces by internal reflection. A pupil expander is formed from a waveguide comprising a first graded/partially reflective surface 420 (e.g. a graded mirror having varying reflectivity with distance) and a second fully reflective surface 410 (e.g. a mirror having substantially 100% reflectivity). In particular, first reflective surface 420 comprises a reflective coating the reflectivity of which decreases along the length of the slab. The layer may be glass or Perspex. The waveguide may therefore be a glass or Perspex block or slab. The first reflective surface may be a first surface of the glass block and the second reflective surface may be a second surface of the glass block, wherein the first surface is opposite and parallel to the second surface. Alternatively, the layer may be air and the first and second reflective surface may be separate components—e.g. a first and second mirrors spatially-separated to form an air gap within which light propagates by internal reflection.

Accordingly, as shown in FIG. 4, an input light beam 402 (which may comprise spatially modulated light encoded with a picture (i.e. light of a picture/image or, simply a picture) or spatially modulated light encoded with a hologram as described below) comprising input light rays enters the waveguide through an input port (i.e. entrance pupil) thereof. The input light beam 402 is received from projection optic 402. Thus, the input light beam 402 is a beam of uncollimated light. That is, the light is not collimated but comprises light rays at a plurality of angles. In embodiments, the picture is displayed at a display plane and projection optic 402 is arranged as a magnifier. Thus, the display plane is at a distance less than the focal length of projection optic 402 so that a magnified image of the picture if formed. The magnified image of the picture is a virtual image. The waveguide is arranged to guide light received at the input port to a viewing window (i.e. exit pupil). In the illustrated arrangement, the input port comprises a gap in the first partially reflective surface 420 near one end of the waveguide, but other positions for the input port are possible. In embodiments, the size of the exit pupil of the picture generating unit is greater than the size of the entrance pupil of the waveguide. It may be said that there is slight overfilling (rather than matching of) the exit pupil to the entrance pupil. This is described further below with reference to FIGS. 8A to 8C. The viewing window is an area or volume within which a viewer may view an image as described herein. The angle of incidence of the input light beam 402 is such that the light rays propagate along the length of the waveguide due to internal reflection by first partially reflective surface 420 and second fully reflective surface 410. Example rays are illustrated in FIG. 4. Due to the graded reflectivity of first reflective surface 420, a proportion of light is transmitted by first reflective surface 420 to provide a plurality of output light rays 404a-f (herein called "replicas" because they replicate the input light rays) along the length of the waveguide. Thus, first reflective surface 420 forms a viewing surface. It is said that the pupil (or viewing window) is expanded by the replicas formed by the waveguide. In particular, by forming a plurality of replicas 404a-f along the length of the waveguide, the exit pupil is increased in size. Each replica 404a-f corresponds to a proportion of the amplitude (intensity or brightness) of the input light beam 402. It is desirable that the grading provides a decrease in reflectivity (or conversely an increase in transmissivity) of the first reflective surface 420 along the length of the waveguide such that each replica 404a-f has substantially the same amplitude. Thus, a viewer 430 at the eye box at a viewing distance from the first reflective surface 420 is able to see the image at any position within the viewing window, as illustrated by arrows 440.

The waveguide shown in FIG. 4 expands the pupil in one dimension—corresponding to the lengthwise direction along which the light beam propagates within the waveguide—as shown by arrows 440. As the skilled person will appreciate, it is possible to expand the pupil in two dimensions, when required, by using two orthogonal waveguides.

The first reflective surface 420 of the waveguide may be coated with a coating comprising a large number of thin films (e.g. 25 or more thin films) in order to provide the necessary graded reflectivity. In particular, as described above, such thin films or similar coatings need to provide decreasing reflectivity, and thus increasing transmissivity, with propagation distance such that the brightness (ray intensity) of each replica 404a-f is substantially constant. The amplitude of the propagating light beam reduces with propagation distance due to output of the replicas 404a-f and due to any other optical losses such as imperfect reflections from the second reflective surface 410. Thus, the grading of the first reflective surface 420 is designed to take into account the drop in intensity of the propagating light beam with propagation distance, whilst ensuring that each replica 404a-f has substantially the same intensity so that the image seen has uniform brightness.

Aperture Limiting

Figure 5A:
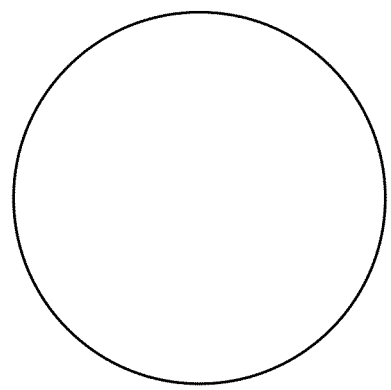
FIGS. 5A to 5D illustrate restriction of the aperture stop in a first direction of pupil expansion.

FIG. 5A shows the circular cross-section of a simple projection optic in accordance with the present disclosure. The cross-section is circular.

Figure 5B:
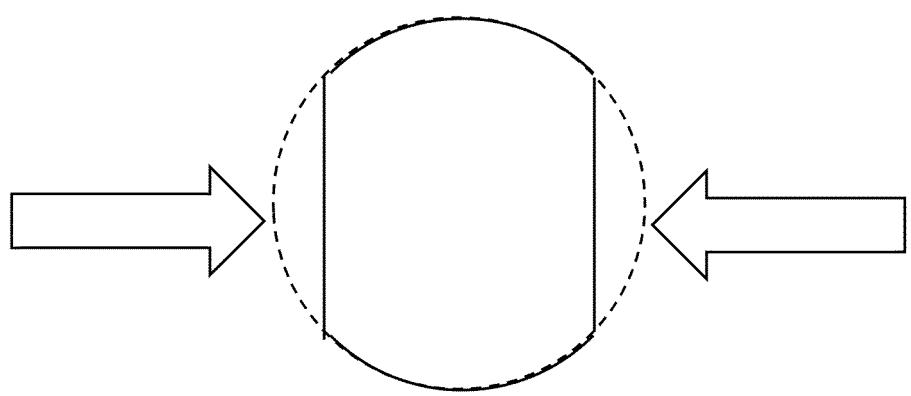
Figure 5C:
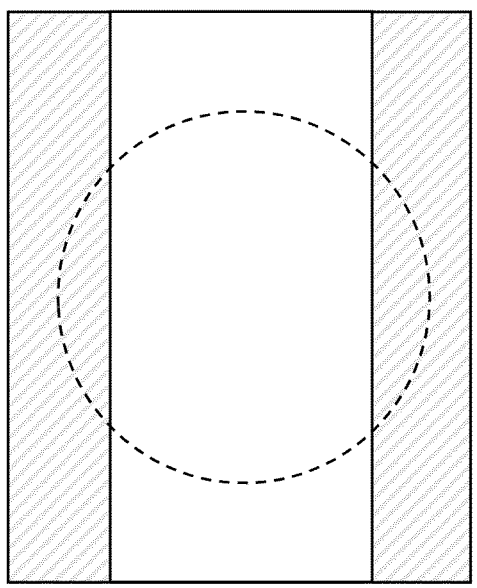
Figure 5D:
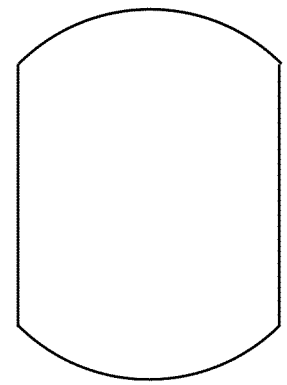

FIG. 5B shows a first example of reducing the aperture of the projection optic in the x-direction by reducing the physical size of the optic. In the first example, the lens is cropped in the x-direction from two sides. The size of the lens in the x-direction is reduced and the size of the lens is the y-direction is not reduced. The lens has two straight sides that are perpendicular to the x-direction. The lens shaped shown in FIG. 5B may be formed by cutting the lens of FIG. 5A. In the first example, the shape of the projection lens defines the aperture stop. The aperture stop is defined by cropping the projection lens. The dimension of the projection lens in the direction of pupil expansion is less than the dimension of the projection lens in the direction orthogonal to the direction of pupil expansion. In the first example, it may be said that the shape of the projection lens defines the aperture stop. The projection lens is cropped in the x-direction in order to reduce the aperture defined by the projection lens. FIG. 5C shows a second example of reducing the aperture of the projection lens in the x-direction using a mask. The mask comprises a rectangular window having a size in the x-direction less than the diameter of the physical lens and a size in the y-direction that is greater than the diameter of the projection lens. The window is centred on the lens. In the second example, the mask is the aperture stop. FIGS. 5B and 5C provide two examples of reducing the aperture of the projection lens in a first direction. The limiting aperture of the imaging system is defined on the plane of the projection lens. An aperture stop is defined on the projection lens by cropping or masking the projection lens. The aperture defined by the aperture stop includes a centre section of the projection lens and excludes a peripheral section of the projection lens. FIG. 5D shows the shape of the aperture defined by the aperture stop. The aperture shown in FIG. 5D defines an optically active area of the projection lens. The optically inactive area of the projection lens may optionally be removed by machining.

The cropping of a lens, for example by machining, is known to lead to adverse effects. For example, cut faces of the lens due to cropping are expected to cause internal reflections that may adversely affect the projected light beam. Thus, substantial cropping produces wide cut faces (with relatively large surface area) that may be expected to cause significant internal reflections and consequential aberrations, in contrast to mere trimming that produces narrower cut faces. However, the inventor has unexpectedly found that, in some examples, the effects of such internal reflections are acceptable, whilst, in other examples, such reflections can be minimised by using a black coating on the cut faces. Furthermore, a limiting aperture stop due to cropping of the lens causes the projected image to be "vignetted" (i.e. cropped, narrowed or diminished). The inventor has found that the image can be extended using the waveguide pupil expander instead of the lens, in particular, the waveguide pupil expander may form sufficient replicas to expand the exit pupil/viewing window to compensate for the narrowed/diminished image at the entrance pupil thereof.

Figure 5E:
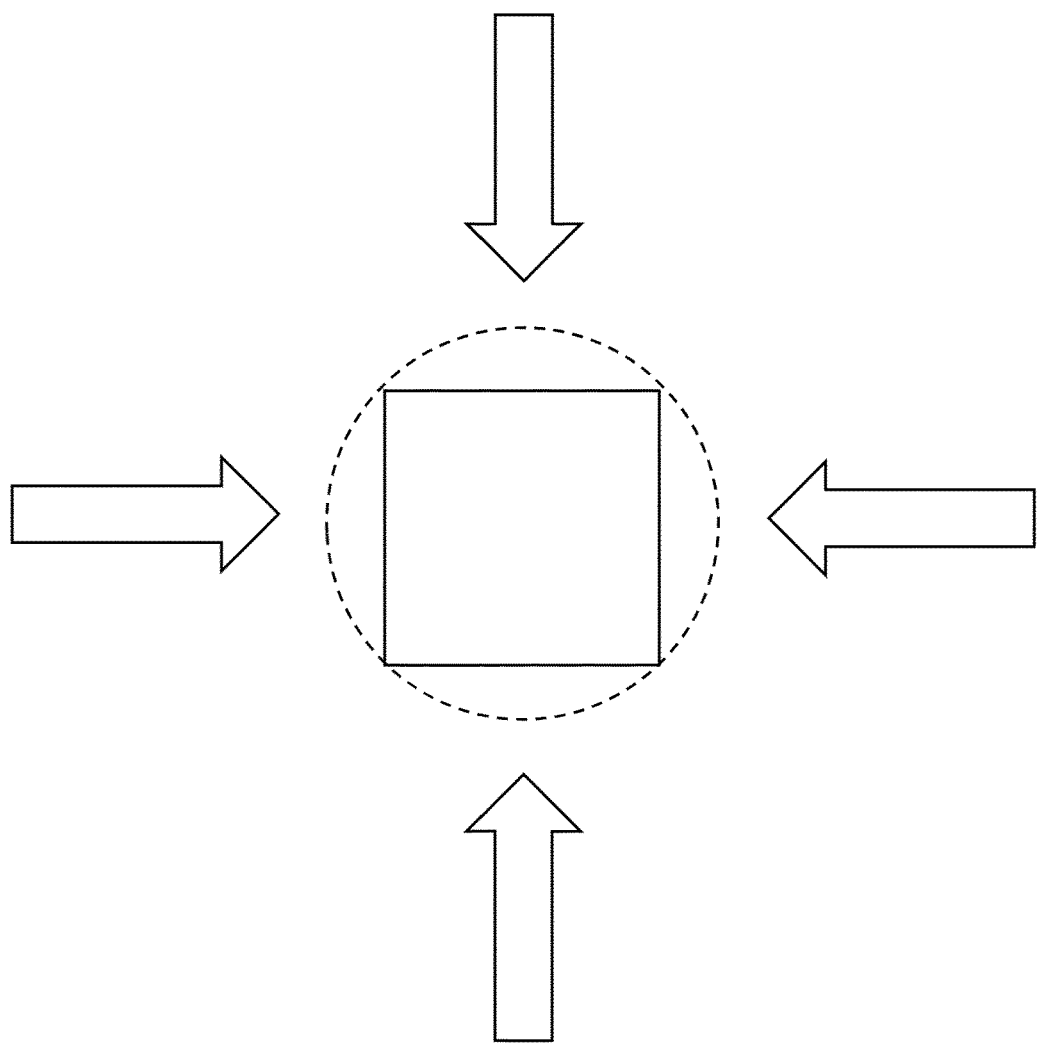
FIGS. 5E to 5G illustrate restriction of the aperture stop in a first and second direction of pupil expansion.
Figure 5F:
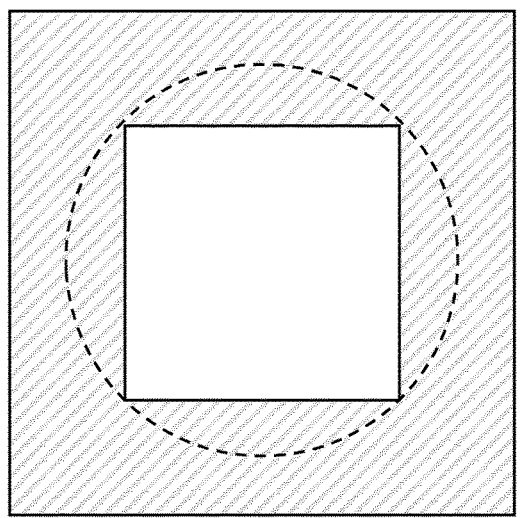
Figure 5G:
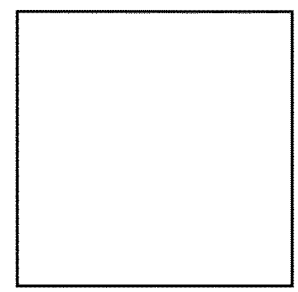

In some embodiments, a second waveguide pupil expander is used to expand the aperture stop of the imaging system in a second direction orthogonal to the first direction. In these embodiments, the aperture stop of the projection lens is reduced in the second direction by cropping or masking, for example, as described above in relation to the first direction. FIG. 5E shows a first example of reducing the size of the aperture of the projection lens in the x and y-directions by cropping. FIG. 5F shows a second example of a mask for reducing the size of the aperture of the projection lens in the x and y-directions. FIG. 5G shows the aperture of the aperture stop of embodiments comprising two orthogonal waveguide pupil expanders.

Pupil Expansion

Figure 6:
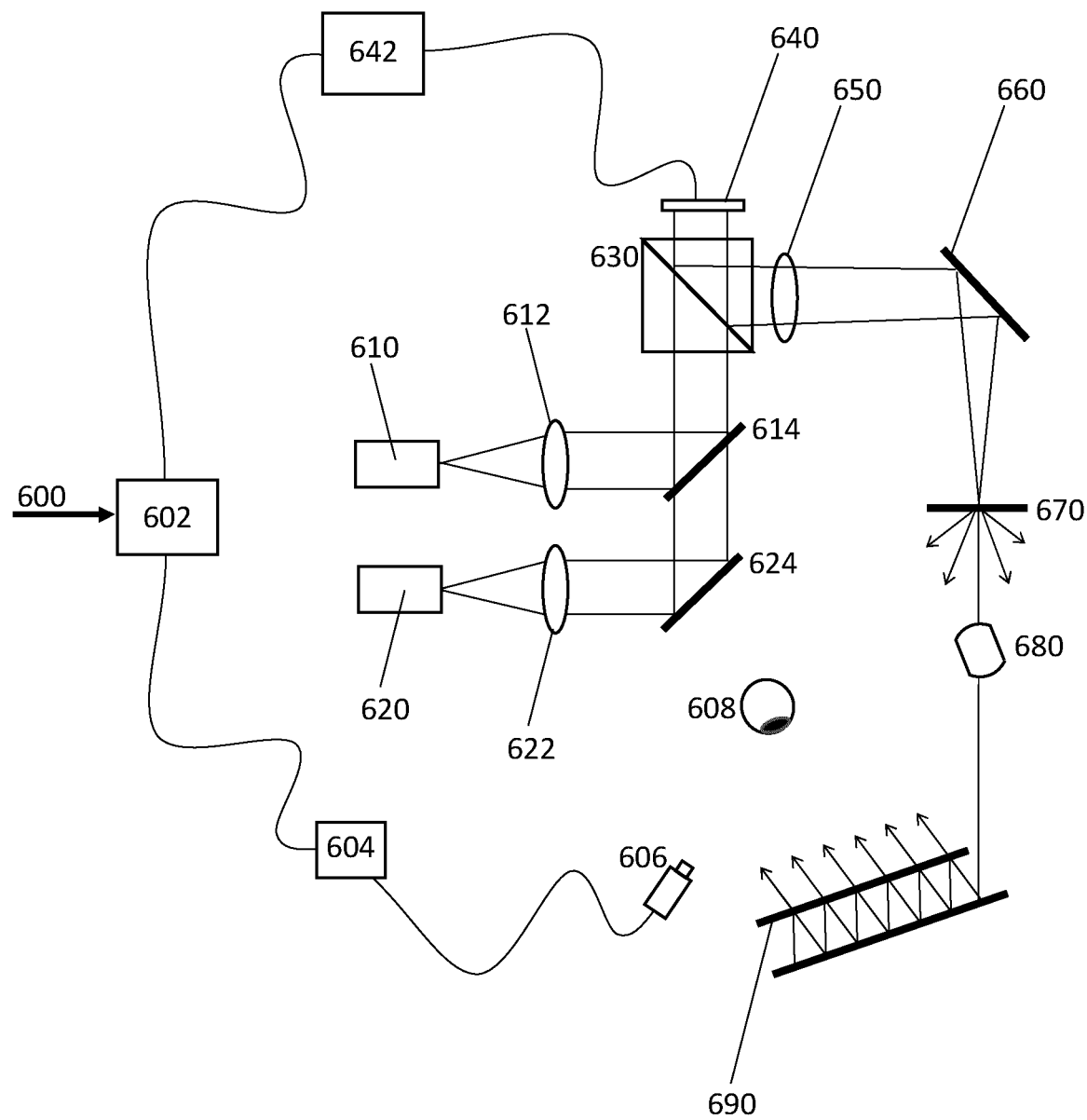
FIG. 6 shows a holographic display device comprising a pupil expander in accordance with embodiments.

FIG. 6 shows a holographic display device comprising a waveguide forming a waveguide pupil expander in accordance with the present disclosure. In FIG. 6, two single colour display channels are shown by way of example only. The present disclosure may comprise only one single colour channel or any comprises any number of single colour channels such as three (red, green and blue).

Holographic display device comprises a picture generating unit arranged to form a first picture (also called "first image") and a second picture (also called "second image"). A first single colour channel (also called "first display channel") is arranged to form the first picture and comprises a first light source 610, a first collimating lens 612 and a first dichroic mirror 614. First dichroic mirror 614 is arranged to reflect light of a first wavelength along a common optical path so as to illuminate a spatial light modulator (SLM) 640. The first wavelength of light corresponds to the first display channel of a first colour (e.g. red). A second single colour channel (also called "second display channel") is arranged to form the second picture and comprises a second light source 620, a second collimating lens 622 and a second mirror 624. Second mirror 624 is arranged to reflect light of a second wavelength along the common optical path so as to illuminate the SLM 640. The second wavelength of light corresponds to the second single colour channel of a second colour (e.g. green). As described below, in other embodiments, the picture generating unit may comprises a third single colour/display channel (equivalent to the first and second channels) arranged to form a third picture, wherein the third colour channel corresponds to a wavelength of light of a third colour (e.g. blue). In the illustrated embodiment, SLM 640 comprises a single array of light modulating pixels (e.g. LCOS) that is illuminated by light of both the first and second wavelengths. In other embodiments, SLM 640 may comprise separate arrays of light modulating pixels that are illuminated by light of the respective first and second wavelengths.

Holographic display device further comprises a holographic controller 602 arranged to control the picture generating unit, specifically the light output by picture generating unit as described herein. First spatially modulated light of the first colour corresponding to the first picture is output by SLM 640 to form a first single colour image (e.g. red image) on a light receiving surface 670, such as a screen or diffuser. A first single colour computer-generated hologram is calculated by a holographic controller 602 and encoded on SLM 640, for example by a display driver 642. The SLM 640 displays the first hologram and is illuminated by light of the first colour from the first colour/display channel to form a first holographic reconstruction on the light receiving surface 670 which is positioned at the replay plane. Similarly, second spatially modulated light of the second colour corresponding to the second picture is output by SLM 640 to form a second single colour image (e.g. green image) on the light receiving surface 670. A second single colour computer-generated hologram is encoded on SLM 640 by holographic controller 602. The SLM 640 displays the second hologram and is illuminated by light of the second colour from the second colour/display channel to form a second holographic reconstruction on the light receiving surface at the replay plane. In the illustrated arrangement, a beam splitter cube 630 is arranged to separate input light to SLM 640 and spatially modulated light output by SLM 640. A Fourier lens 650 and mirror 660 are provided in the optical path of the output spatially modulated light to light receiving surface 670. It may be said that a first/second picture is formed on the light receiving surface 670. The first/second pictures are first/second holographic reconstructions of the respective first/second holograms. Thus, a composite colour picture may be formed on light receiving surface 670 combining the first and second pictures. A projection lens 680 is arranged to project the first and second pictures formed on the light receiving surface 672 to an input port of a pupil expander in the form of a waveguide 690. A viewer 608 may view a magnified image of the pictures from the eye box formed by waveguide 690 owing to optical power of projection lens 680. Waveguide 690 comprises an optically transparent medium separated by first and second reflective surfaces as described above with reference to FIG. 4. Thus, holographic display device has an "indirect view" configuration—that is the viewer does not directly view the holographic reconstruction, but rather views pictures formed on light receiving surface 670.

As described herein, in embodiments, projection lens 680 is cropped to form a limiting aperture stop that restricts the aperture in the direction of pupil expansion by pupil expander 690. Thus, peripheral parts of the projection lens 680 with the largest curvature are removed to leave only a central part of the lens with minimal curvature. In the illustrated arrangement, the display plane is a diffuser. In embodiments, the diffuser may spread the light of the picture at high angles (e.g. to a cone of up to 80 degrees) beyond the limiting aperture stop of the projection lens 680. In other embodiments, the diffuser spreads the light to a narrower cone that falls entirely inside the aperture stop (e.g. to a cone of 5 degrees). The projection lens 680 receives light from the diffuser in multiple directions and projects light into pupil expander 690 at a range of angles. It may be said that projection lens 680 couples uncollimated light into the pupil expander 690. In consequence, the angles of the rays entering the input port, and propagating within, the pupil expander 690 are not unduly restricted so as to maximise the spatial frequency bandwidth. This is illustrated below with reference to FIGS. 8A to 8C.

The holographic display device further comprises a viewer-tracking system comprising an eye tracking camera 606 and an eye tracking controller 604. As known in the art, eye tracking camera is arranged to capture images of the eye(s) of the viewer for tracking the eye position, and thus the viewing position within the viewing window. Eye tracking controller 604 provides feedback to holographic controller 602 indicating the current viewing position. The viewer-tracking system is optional.

Light Geometry

Figure 7A:
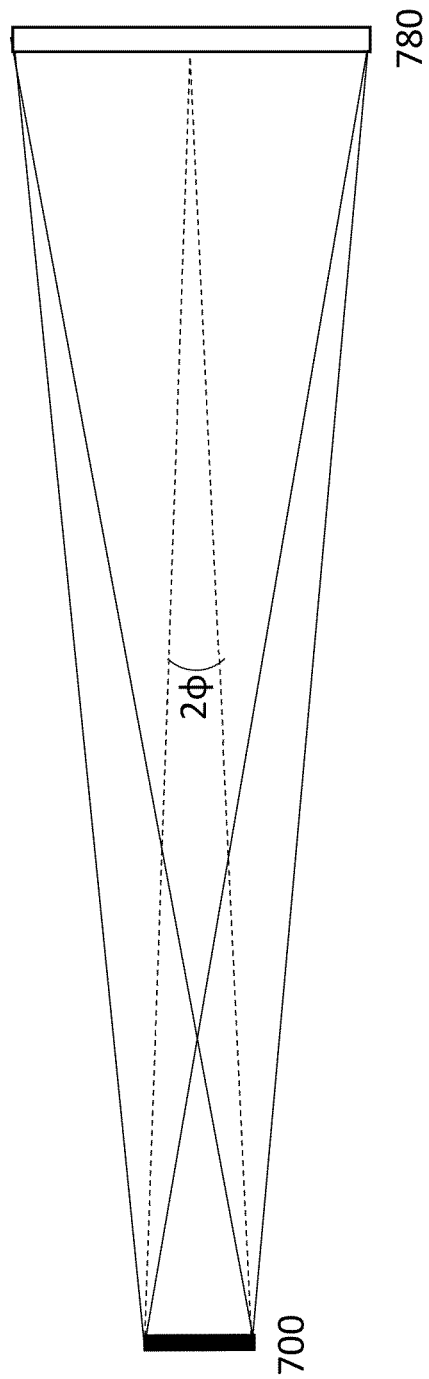
FIGS. 7A to 7C show the geometry of the pupil expander in accordance with embodiments.
Figure 7B:
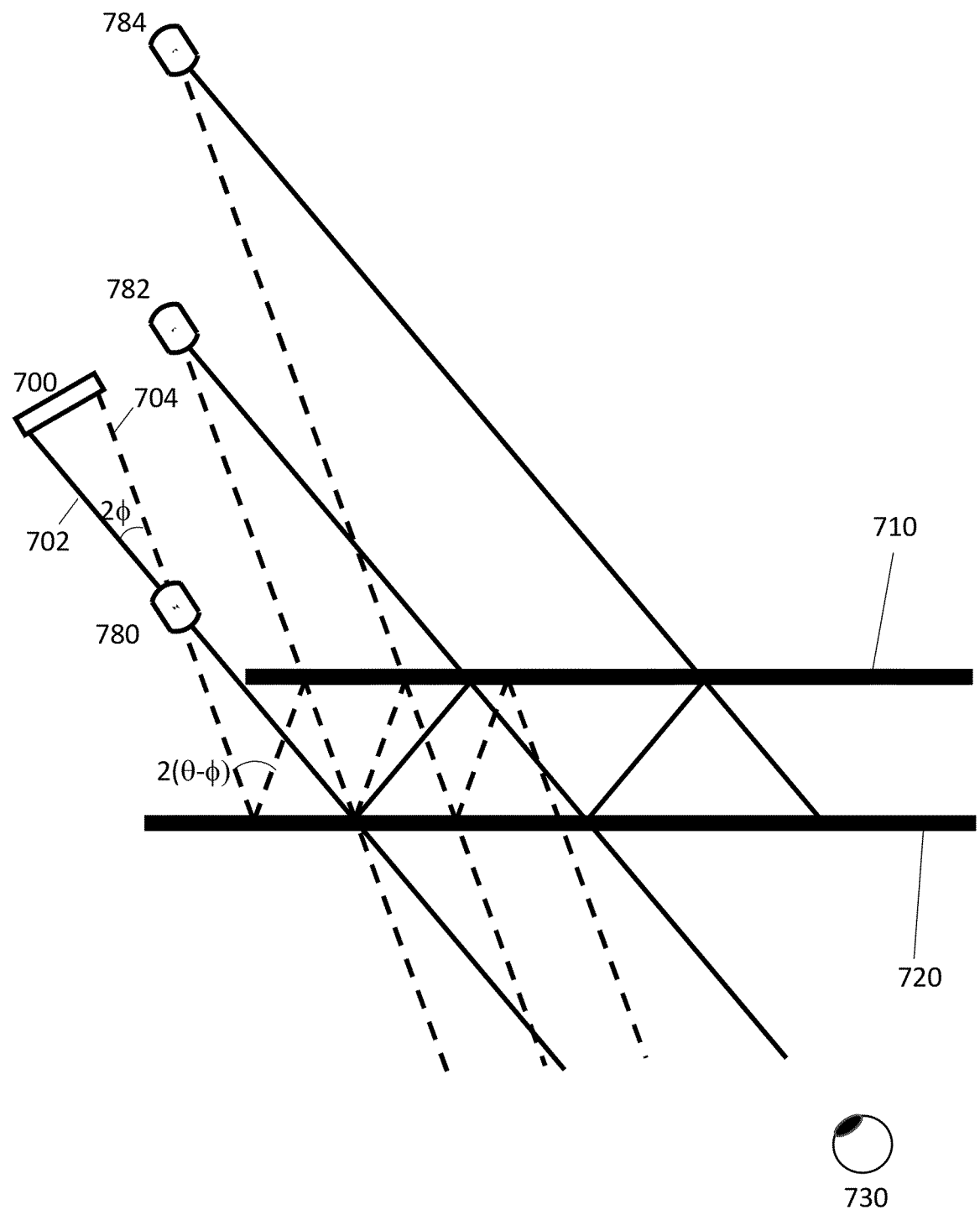
Figure 7C:
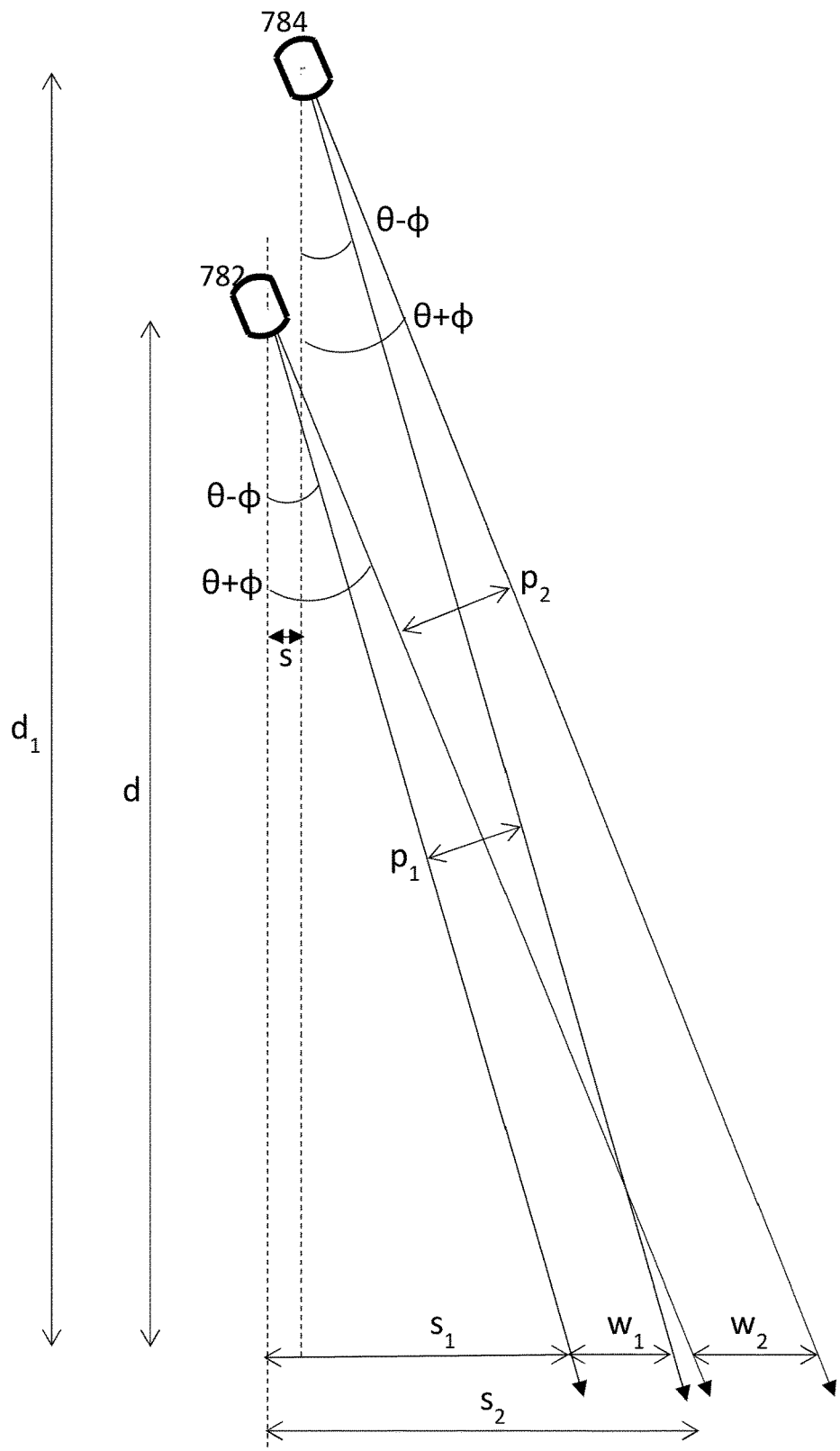
Figure 7C:

FIGS. 7A-C show the geometry of the waveguide pupil expander in accordance with embodiments. In particular, FIG. 7A shows the chief rays of the image beam comprising light of the picture between diffuser 700 and projection lens 780. The chief rays subtend an angle of $2\phi$. FIGS. 7B and 7C show the positioning, and propagation along waveguide, of the chief rays of an input image beam 702 (as a described above) and the output of replicas visible to viewer 730. Waveguide comprises first partially reflective surface 720 and second fully reflective surface 710 and an air gap at one end thereof, forming an input port (entrance pupil) as described above.

The geometry shown in FIG. 7C may be represented by the following equations.

$w_1 = 2d\tan(\theta-\phi)$ $w_2 = 2d\tan(\theta+\phi)$ $p_1 = 2d\sin(\theta-\phi)$ $p_2 = 2d\sin(\theta+\phi)$ $\tan(\theta-\phi) = s_1/d = (s_1+w_1-s)/d_1$ $\tan(\theta+\phi) = s_2/d = (s_2+w_2-s)/d_1$ $s_1 d_1 = (s_1+w_1-s)d$ $s_1 \Delta d = 2d^2\tan(\theta-\phi) - sd$ (1)

$s_2 d_1 = (s_2+w_2-s)d$ $s_2 \Delta d = 2d^2\tan(\theta+\phi) - sd$ (2)

Subtract (1) from (2)

$\Delta d = 2d^2(\tan(\theta+\phi) - \tan(\theta-\phi))/(s_2-s_1)$

Subtract $s_1$(2) from $s_2$(1)

Figure 8A:
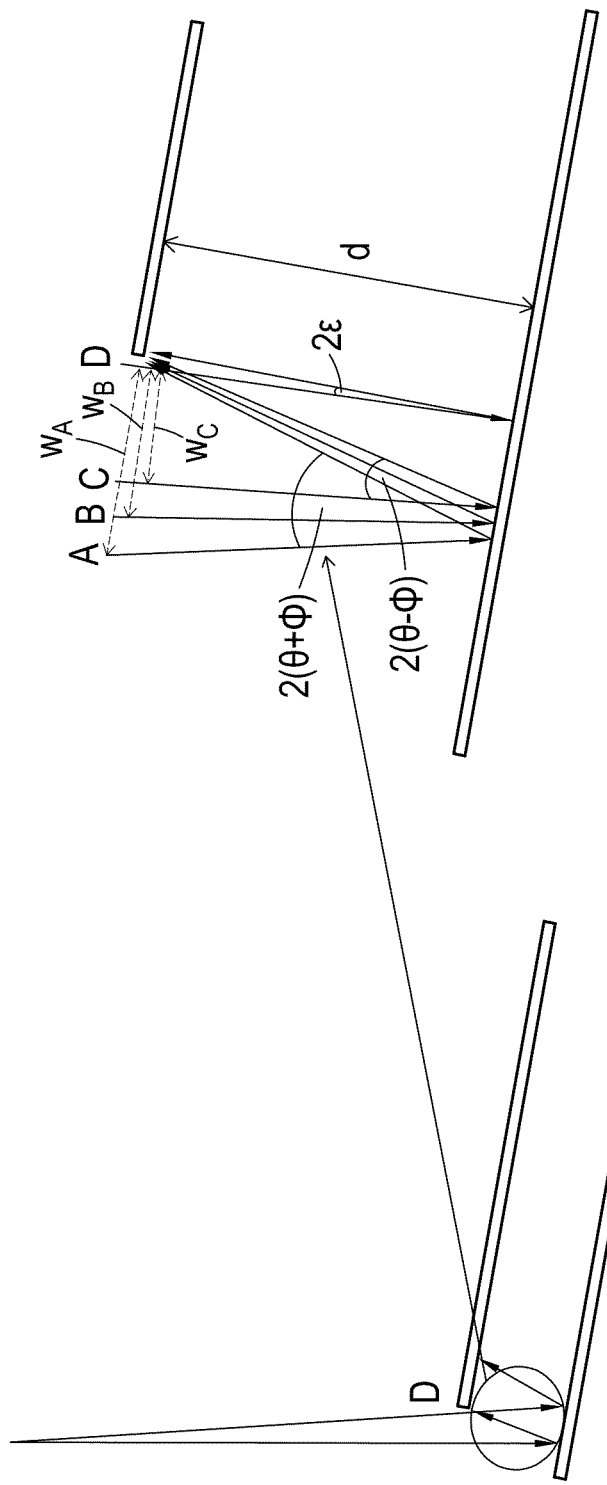
FIG. 8A shows the geometry of rays entering the pupil expander.
Figure 8B:
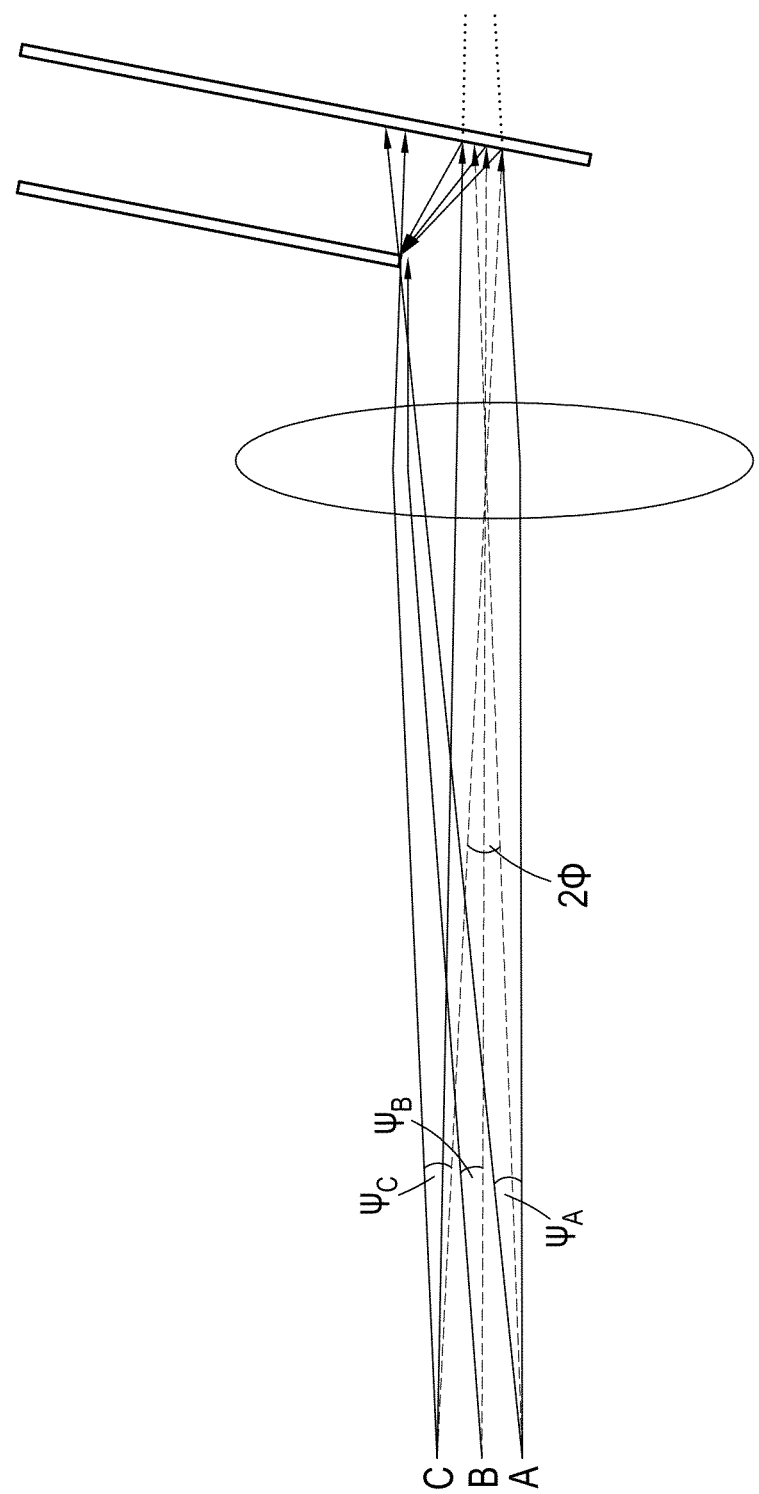

$0 = 2s_2 d^2 \tan(\theta-\phi) - ss_2 d - 2s_1 d^2 \tan(\theta+\phi) - ss_1 d$ $s = (2s_2 d\tan(\theta-\phi) - 2s_1 d\tan(\theta+\phi))/(s_1+s_2)$ $= (s_2 w_1 - s_1 w_2)/(s_1+s_2)$ FIG. 8A shows the geometry further. B is the limit for axial rays (i.e. originating from the centre of the diffuser), A is the limit for rays inclined at $-\phi$ and C is the limit for rays inclined at $+\phi$ (i.e. originating from the edges of the diffuser, as in FIG. 7A). The axial ray from B is at an angle $\theta$ to the waveguide and D is the ray inclined to the axis at $\theta-\varepsilon$. It can be seen light rays from the positions A, B and C on the diffuser are coupled into the waveguide pupil expander at a range of angles. As shown in FIGS. 8B and 8C, this arrangement couples into the waveguide pencils of rays from A, B and C that have angles within cones that subtend angles $\psi_A$, $\psi_B$ and $\psi_C$, respectively. It may be said that the pencils of rays from A, B and C within $\psi_A$, $\psi_B$ and $\psi_C$, respectively, are captured by the limiting aperture stop (e.g. cropped lens) and coupled into the entrance pupil. In particular, these rays pass through the input port, and are reflected from the rear mirror of the waveguide at angles such that the rays are just inside the edge of, and so are incident on, the front mirror, and so are coupled into the pupil expander. A sufficiently wide field of view (FOV) is achieved by accommodating the chief rays for the centre B and the extremes field positions A and B on the diffuser. These couple into the waveguide differently, as shown in dashed line in FIGS. 8B and 8C.

In particular, FIG. 8B shows the geometry of rays from A, B and C that are coupled into a waveguide pupil expander with an input port comprising an air gap at one end thereof. FIG. 8C shows the geometry of rays from A, B and C that are coupled into a waveguide pupil expander comprising a glass slab with an input port comprising a mirror free gap in the first surface thereof. The dotted lines extrapolated to the rear of the second mirrored surface of waveguide pupil expander show the direction of the respective limit rays for C and A.

As the skilled person will appreciate from the geometry shown in FIGS. 7A to 7C and 8A to 8C, the rays from the limits A, B and C may be coupled into the pupil expander by projection optic with an aperture stop having a diameter less than 30% of the diameter of the projection lens. Thus, in embodiments in which the aperture stop is formed by cropping the lens, a substantial portion of the lens (which represents more than conventional "trimming") may be removed. The skilled person will further appreciate from the geometry, the amount of cropping so as to couple the rays from limits A, B and C into the waveguide is dependent the curvature of the lens, and thus the convergence angles of the chief rays, the size of the input port/entrance pupil of the waveguide pupil expander and the distance between the lens and the waveguide pupil expander. For example, it would be possible to crop the lens so that only the chief rays from limits A, B and C are transmitted. However, this would reduce light throughput. Accordingly, embodiments crop the lens to allow all the rays from A, B and C within $\psi_A$, $\psi_B$ and $\psi_C$, respectively, to be transmitted, as illustrated. The inventor has found with such embodiments, a trade-off is struck, which maximises light throughput whilst maintaining image quality. This results in a slight overfilling (rather than matching of) the exit pupil of the picture generating unit to the entrance pupil of the pupil expander waveguide.

Head-Up Display

Commercially-viable displays for the automotive industry are proposed using dynamic spatial light modulators including phase modulators. The main advantages of phase modulation are light efficiency and fault tolerance.

Figure 9:
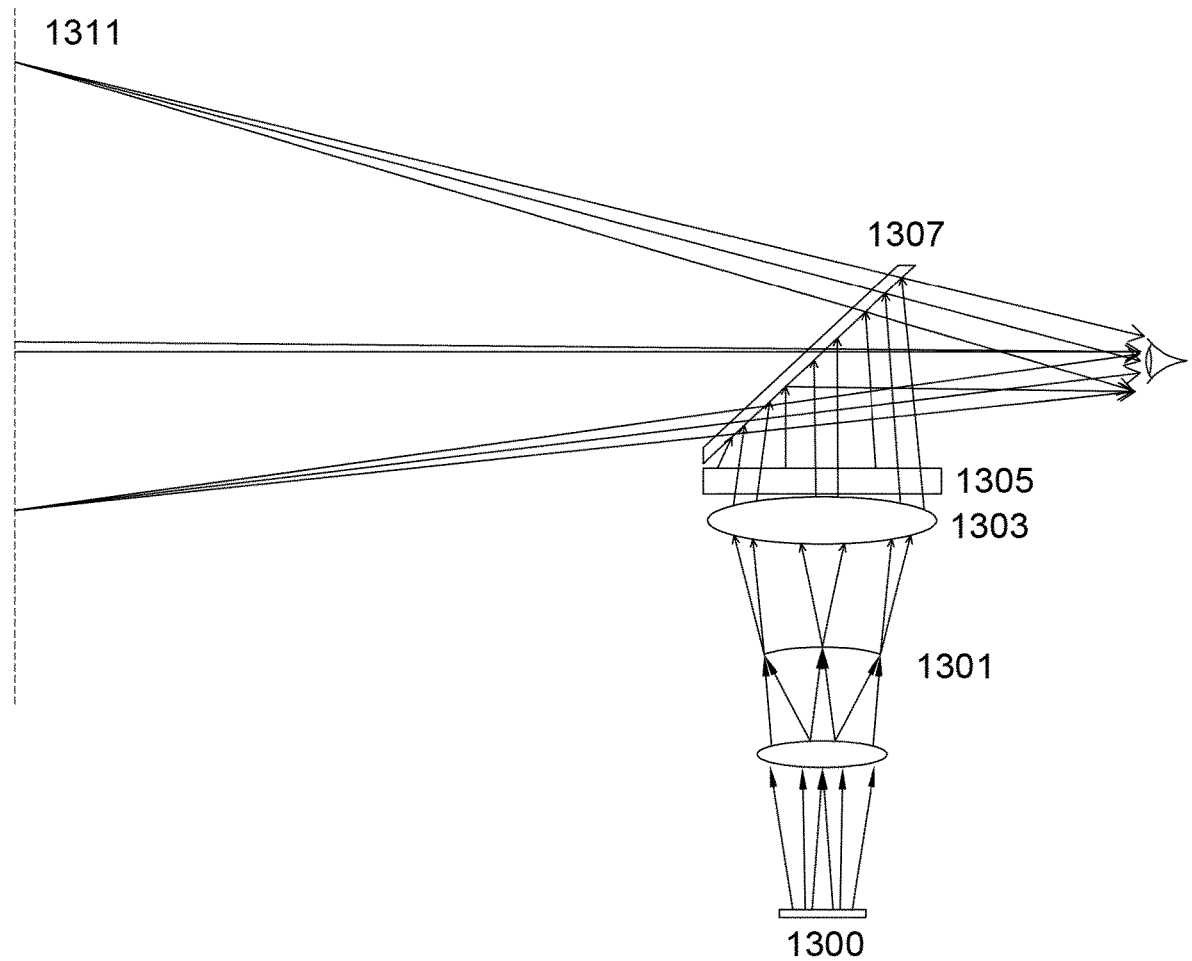
FIG. 9 illustrates virtual image formation in a head-up display using a pupil expander and optical combiner such as windscreen.

FIG. 9 show a system for forming a virtual image using the pupil expander 1305 of the present disclosure. The physical extent of the holographic replay field 1301 is limited by the maximum diffraction angle, Om, of the SLM 1300. Associated with each point in the replay field 1301 is a pencil of rays, which diverges with angle, φ, and of which the chief ray also diverges. In Fourier holographic replay, the angle, φ, gives the field of view (FOV) of the reconstruction. A small FOV is a correlate of a large replay field size. The angle of the chief rays is determined by the curvature of the replay field. A projection optic 1303 (e.g. lens or powered mirror) is used to view a virtual image of the replay field 1301 at a large distance (e.g. 2 m, 5 m, 15 m, etc). This is illustrated in FIG. 9. The virtual image is formed on virtual image plane 1311. The combiner 1307 shown in FIG. 9 is typically the windscreen of the car. If the chief ray from each ray pencil is projected back, they will meet at a distance from the lens, u, determined by the curvature of the replay field surface. The eye pupil placed at a distance, v, from the projection lens 1303, where v is given by the lens equation, will view the complete image. The FOV is now the total field subtended at the eye pupil 1309 in FIG. 9.

In addition to viewing the complete image, it is essential that the driver be able to move his/her head around within a limited area at the designed distance, v. In order to be able to keep looking at the complete image as the eye looks around, the pupil expander 1305 is employed. The pupil expander 1305 enlarges the exit pupil due to the generation of extra rays by division of amplitude of the incident wavefront as described above. The extra rays augment the visual field directly below the eye. A further consequence is that a larger image size can be supported and, hence, a larger FOV.

The Applicant has fabricated waveguides based on glass and air cavities to function as the pupil expander. The uniformity of the expansion can be tailored using either graded reflectors or tailored diffraction gratings on the surface of the waveguide or in the bulk. Alternative technologies may be used for the pupil expander. For example, microlens arrays that result in a virtual image location which is close behind the expander. The main virtue of a HUD including the display device of the present disclosure is the reduction of eye focus correction between the virtual image and the road viewed by the driver.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the detector is a photodetector such as a photodiode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In embodiments, only the primary replay field is utilised and system comprises physical blocks, such as baffles, arranged to restrict the propagation of the higher order replay fields through the system.

In the above described embodiments, the holographic reconstruction is a composite colour image. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A display system having a viewing window on a viewing plane, wherein the display system comprises:
   a picture generating unit arranged to display a picture on a display plane, wherein the picture is a holographic reconstruction formed from a hologram of the picture; and
   an imaging system arranged to form an image of the picture that is viewable from the viewing window, wherein the imaging system comprises:
   a projection lens disposed between the display plane and the viewing plane, wherein the projection lens is a simple lens arranged to magnify the picture and to form an image of the picture on an image plane;
   an aperture stop arranged to restrict an aperture of the projection lens in a first direction and function as a limiting aperture stop of the imaging system, wherein the aperture stop includes a mask comprising a rectangular window, wherein the mask is configured to block light rays emitted from a peripheral section of the projection lens in the first direction, and wherein the rectangular window has a size in the first direction that is less than a diameter of the projection lens in the first direction; and
   a first waveguide pupil expander arranged to receive light of the picture from the projection lens through the aperture stop and replicate the aperture stop in order to expand the viewing window of the display system in the first direction.

2. The display system of claim 1, wherein a diameter of the aperture stop is less than a diameter of the projection lens, optionally, wherein the diameter of the aperture stop is less than 80% the diameter of the projection lens such as less than 60% or less than 30% the diameter of the projection lens.

3. The display system of claim 1, wherein the projection lens is a spherical lens such as a biconvex lens.

4. The display system of claim 1, wherein the display plane comprises a screen, such as a diffuser, arranged to display the picture.

5. The display system of claim 1, wherein an exit pupil of the picture generating unit is larger than an entrance pupil of the first waveguide pupil expander.

6. The display system of claim 1, wherein the picture generating unit comprises a spatial light modulator arranged to display the hologram of the picture and a light source arranged to illuminate the hologram during display in order to form the holographic reconstruction on the display plane.

7. The display system of claim 1, wherein the picture comprises a first color component and a second color component.

8. The display system of claim 1, further comprising a second waveguide pupil expander arranged to receive an output of the first waveguide pupil expander and replicate the aperture stop in a second direction in order to further expand the viewing window of the display system, wherein the second waveguide pupil expander is perpendicular to the first waveguide pupil expander such that the first direction is orthogonal to the second direction.

9. The display system of claim 8, wherein the aperture stop is arranged to reduce the aperture of the projection lens in the second direction.

10. The display system of claim 8, wherein each waveguide pupil expander comprises a pair of parallel reflective surfaces arranged to guide the light of the picture from an input port to the viewing window by a series of internal reflections therefrom, and wherein a reflectivity of one reflective surface of the pair of parallel reflective surfaces is provided by a graded coating that is partially transmissive.

11. A head-up display comprising a display system having a viewing window on a viewing plane, wherein the display system comprises:
a picture generating unit arranged to display a picture on a display plane, wherein the picture is a holographic reconstruction formed from a hologram of the picture; and
an imaging system arranged to form an image of the picture that is viewable from the viewing window, wherein the imaging system comprises:
a projection lens disposed between the display plane and the viewing plane, wherein the projection lens is a simple lens arranged to magnify the picture and to form an image of the picture on an image plane;
an aperture stop arranged to restrict an aperture of the projection lens in a first direction and function as a limiting aperture stop of the imaging system, wherein the aperture stop includes a mask comprising a rectangular window, wherein the mask is configured to block light rays emitted from a peripheral section of the projection lens in the first direction, and wherein the rectangular window has a size in the first direction that is less than a diameter of the projection lens in the first direction; and
a first waveguide pupil expander arranged to receive light of the picture from the projection lens through the aperture stop and replicate the aperture stop in order to expand the viewing window of the display system in the first direction.

12. A method of display using a display system having a viewing window on a viewing plane, the method comprising:
holographically reconstructing a picture on a display plane from a hologram of the picture using a picture generating unit;
forming an image of the picture on an image plane that is viewable from the viewing window using an imaging system by:
magnifying the picture using a projection lens disposed between the display plane and the viewing plane, wherein the projection lens is a simple lens;
restricting an aperture of the projection lens in a first direction via an aperture stop configured to function as a limiting aperture stop of the imaging system, wherein the aperture stop includes a mask comprising a rectangular window, wherein the mask is configured to block light rays emitted from a peripheral section of the projection lens in the first direction, and wherein the rectangular window has a size in the first direction that is less than a diameter of the projection lens in the first direction; and
replicating light passing through the aperture stop in order to expand the viewing window of the display system in the first direction using a first waveguide pupil expander arranged to receive light of the picture from the projection lens.

13. The method of claim 12, further comprising displaying the picture on a screen, such as a diffuser.

14. The method of claim 12, further comprising displaying a hologram of the picture on a spatial light modulator and illuminating the hologram during display using a light source in order to form a holographic reconstruction on the display plane.

15. The method of claim 12, further comprising receiving an output of the first waveguide pupil expander using a second waveguide pupil expander and replicating an aperture stop in a second direction in order to further expand the viewing window, wherein second waveguide pupil expander is perpendicular to the first waveguide pupil expander such that the first direction is orthogonal to the second direction.

16. The method of claim 15, further comprising reducing an aperture of the projection lens in the second direction.

17. A display system having a viewing window on a viewing plane, wherein the display system comprises:
a picture generating unit arranged to display a picture on a display plane, wherein the picture is a holographic reconstruction formed from a hologram of the picture; and
an imaging system arranged to form an image of the picture that is viewable from the viewing window, wherein the imaging system comprises: (i) a projection lens disposed between the display plane and viewing plane, wherein the projection lens is a simple lens arranged to magnify the picture and to form an image of the picture on an image plane, (ii) an aperture stop arranged to restrict an aperture of the projection lens in a first direction and function as a limiting aperture stop of the imaging system, and (iii) a first waveguide pupil expander arranged to receive light of the picture from the projection lens through the aperture stop and replicate the aperture stop in order to expand the viewing window of the display system in the first direction, wherein the aperture stop is a mask comprising a rectangular window, the mask being arranged to block light rays emitted from a peripheral section of the projection lens in the first direction, the rectangular window having a size in the first direction that is less than a diameter of the projection lens in the first direction.

18. A method of display using a display system having a viewing window on a viewing plane, the method comprising:
holographically reconstructing a picture on a display plane from a hologram of the picture using a picture generating unit; and
forming an image of the picture on an image plane that is viewable from the viewing window using an imaging system by: (i) magnifying the picture using a projection lens disposed between the display plane and viewing plane, wherein the projection lens is a simple lens, (ii) restricting an aperture of the projection lens in a first direction via an aperture stop configured to function as a limiting aperture stop of the imaging system, and (iii) replicating light passing through the aperture stop in order to expand the viewing window of the display system in the first direction using a waveguide pupil expander arranged to receive light of the picture from the projection lens, wherein the aperture stop is a mask comprising a rectangular window, the mask being arranged to block light rays emitted from a peripheral section of the projection lens in the first direction, the rectangular window having a size in the first direction that is less than a diameter of the projection lens in the first direction.

* * * * *